US005345605A

United States Patent [19]

Motegi

[11] Patent Number: 5,345,605

[45] Date of Patent: Sep. 6, 1994

[54] INDIVIDUAL SELECTIVE-CALLING RECEIVER WITH REDUCED NUMBER OF SWITCHES

[75] Inventor: Takamasa Motegi, Kawasaki, Japan

[73] Assignee: Matsushita Electric Industrial Co., Ltd., Osaka, Japan

[21] Appl. No.: 853,654

[22] Filed: Mar. 19, 1992

[30] Foreign Application Priority Data

Apr. 2, 1991 [JP] Japan .................................. 3-095012

[51] Int. Cl.[5] .............................................. H04B 1/16

[52] U.S. Cl. ............................ 455/181.1; 340/825.44; 455/183.2

[58] Field of Search .................... 455/38.2, 181.1, 343, 455/183.2, 186.1, 257, 154.1, 171.1, 260; 340/311.1, 825.44

[56] References Cited

U.S. PATENT DOCUMENTS 4,785,468 11/1988 Yoshida .............................. 455/343
4,860,005 8/1989 DeLuca et al. .................... 455/343

FOREIGN PATENT DOCUMENTS 0124626 5/1988 Japan .................................. 455/343
2005633 1/1990 Japan .................................. 455/343
2206926 8/1990 Japan .

*Primary Examiner*—Reinhard J. Eisenzopf
*Assistant Examiner*—Chi Pham
*Attorney, Agent, or Firm*—Stevens, Davis, Miller & Mosher

[57] ABSTRACT

An individual selective-calling receiver is disclosed which includes a switch, a first timer for generating an output signal in a case where the switch is put in an ON-state for a time longer than a first predetermined time, a second timer started by the output signal of the first timer for generating an output signal at intervals of a second predetermined time, and a receiving-frequency selection circuit (for example, a PLL) for selecting one of a plurality of receiving frequencies, and in which the receiving-frequency selection circuit commences a frequency selecting operation on the basis of the output signal of the first timer. The receiving frequencies are successively selected in accordance with the output signal of the second timer, and the frequency selecting operation of the receiving-frequency selection circuit is stopped when the switch is again put in the ON-state, to maintain a selected receiving frequency.

5 Claims, 4 Drawing Sheets

INDIVIDUAL SELECTIVE-CALLING RECEIVER WITH REDUCED NUMBER OF SWITCHES

BACKGROUND OF THE INVENTION

The present invention relates to an individual selective-calling receiver for use in a communication system, in which a plurality of individual selective-calling receivers are given different numbers, and a specified one of the receivers is selectively called by using a plurality of transmitting frequencies.

In a conventional communication system for making individual, selective calling, in order to enhance the utilization efficiency of the system, a plurality of receivers are given different numbers, and a plurality of frequencies (that is, channels) are used for calling one of the receivers and for sending a message. Further, the communication system uses an individual selective-calling receiver shown in FIG. 5. Referring to FIG. 5, a changeover switch 56 (for example, a rotary switch or slide switch) is connected, as a peripheral circuit element, to a CPU 53, and the CPU 53 and a PLL (phase lock loop) 55, for controlling a receiving frequency, are controlled by operating the changeover switch 56, to select one of a plurality of receiving frequencies, thereby putting the receiver in a standby state.

A receiver similar to the receiver of FIG. 5 is disclosed in JP-A-2-206926 (Appl. No. hei 1-28210) filed by the Matsushita Communication Industrial Co., Ltd.

In the individual selective-calling receiver mentioned above; there arises a problem that it is necessary to use many switches, such as a switch for turning on or off a power source, a switch 52 for reading out a stored message, and the switch 51 for manually changing channels. Generally speaking, in an individual, selective-calling receiver, it is desirable, from the standpoint of shape and cost, to unite a slide switch and a pushbutton switch in one slide-type pushbutton switch and to perform all operations by the slide-type pushbutton switch.

SUMMARY OF THE INVENTION

It is an object of the present invention to provide an individual, selective-calling receiver which can solve the above-mentioned problem of the prior art, and in which an ON-OFF action for a power source, the changeover of the calling mode, the changeover of the channel and the display of a selective channel can be made by a single slide-type pushbutton switch.

An individual selective-calling receiver according to the present invention is suitable for use in a communication system, in which a plurality of receivers are given different numbers and a specified one of the receivers is selectively called by using a plurality of transmitting frequencies, and includes a switch, a first timer for generating an output signal in a case where the switch is put in an ON-state for a time longer than a first predetermined time, a second timer started by the output signal of the first timer for generating an output signal at intervals of a second predetermined time, and a receiving-frequency selection circuit for selecting one of a plurality of receiving frequencies. In this individual selective-calling receiver, the receiving-frequency selection circuit commences a frequency selecting operation on the basis of the output signal of the first timer, the receiving frequencies are successively selected in accordance with the output signal of the second timer, and the frequency selecting operation of the receiving-frequency selection circuit is stopped when the switch is again put in the ON-state, to maintain a selected receiving frequency.

DESCRIPTION OF THE PREFERRED EMBODIMENT

Now, an embodiment of an individual selective-calling receiver according to the present invention will be explained below, with reference to the drawings.

Figure 1:
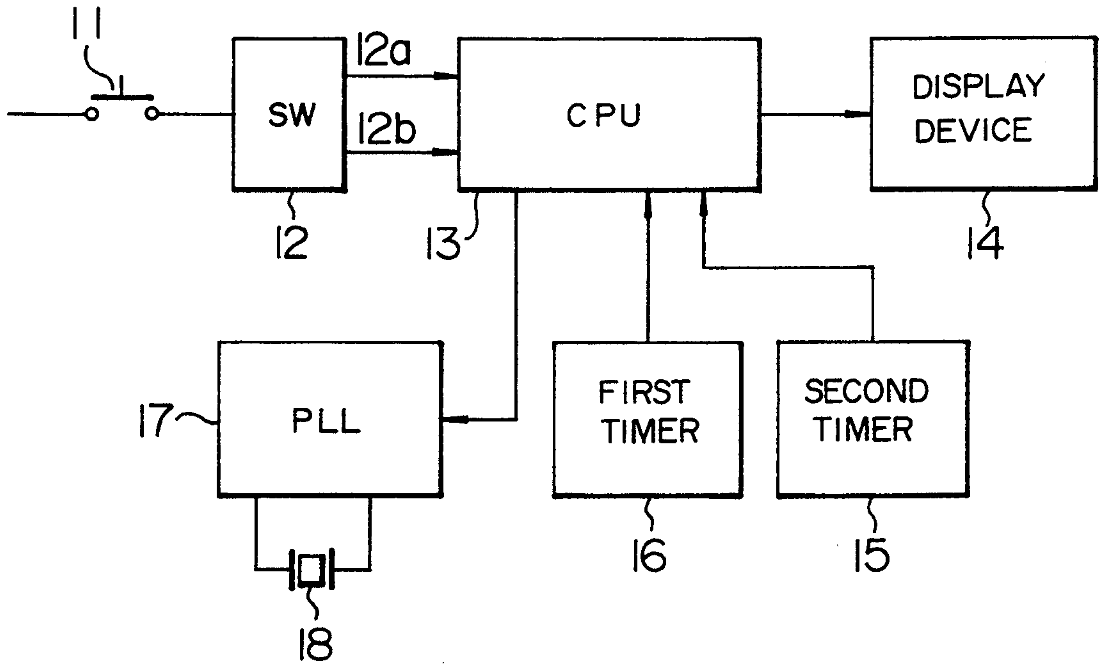
FIG. 1 is a block diagram showing an embodiment of an individual, selective-calling receiver according to the present invention.
Figure 2:
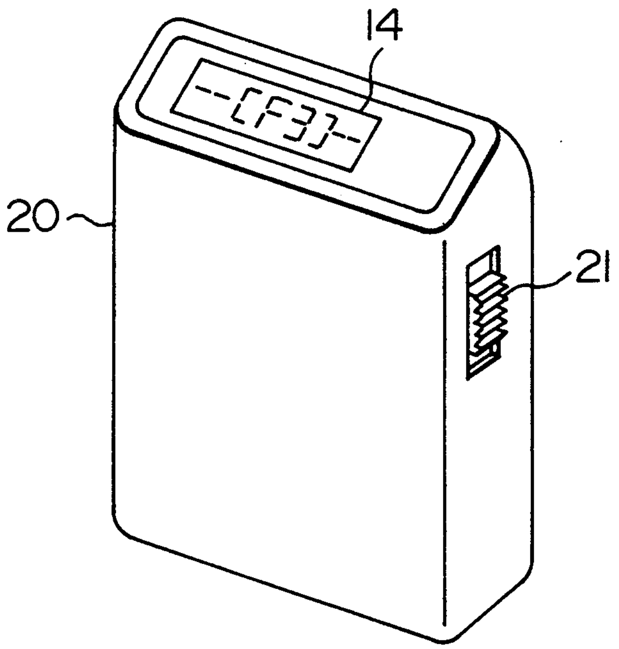
FIG. 2 is a schematic diagram showing the external appearance of the embodiment of FIG. 1.

As shown in FIG. 1, the present embodiment includes a CPU 13, a slide-type pushbutton switch 21 which is shown in FIG. 2, a state-of-switch judging circuit 12 for judging the state of a pushbutton switch 11 included in the slide-type pushbutton switch 21, to apply a signal indicative of the ON-state of the switch 11 to the CPU 13 through an output line 12*a* and to apply a signal indicative of the OFF-state of the switch 11 to the CPU 13 through an output line 12*b*, a display device 14 connected to the CPU 13, a PLL 17 for selecting one of a plurality of receiving frequencies by changing a frequency dividing ratio for the oscillation frequency of a quartz oscillator 18, under control of the CPU 13, a first timer 16 for measuring the duration time of the ON-state indicating signal, which is delivered to the output line 12*a*, and a second timer 15 for updating the name of the receiving channel, which name is displayed by the display device 14, at predetermined intervals of time. FIG. 2 shows the external appearance 20 of the present embodiment.

Figure 3:
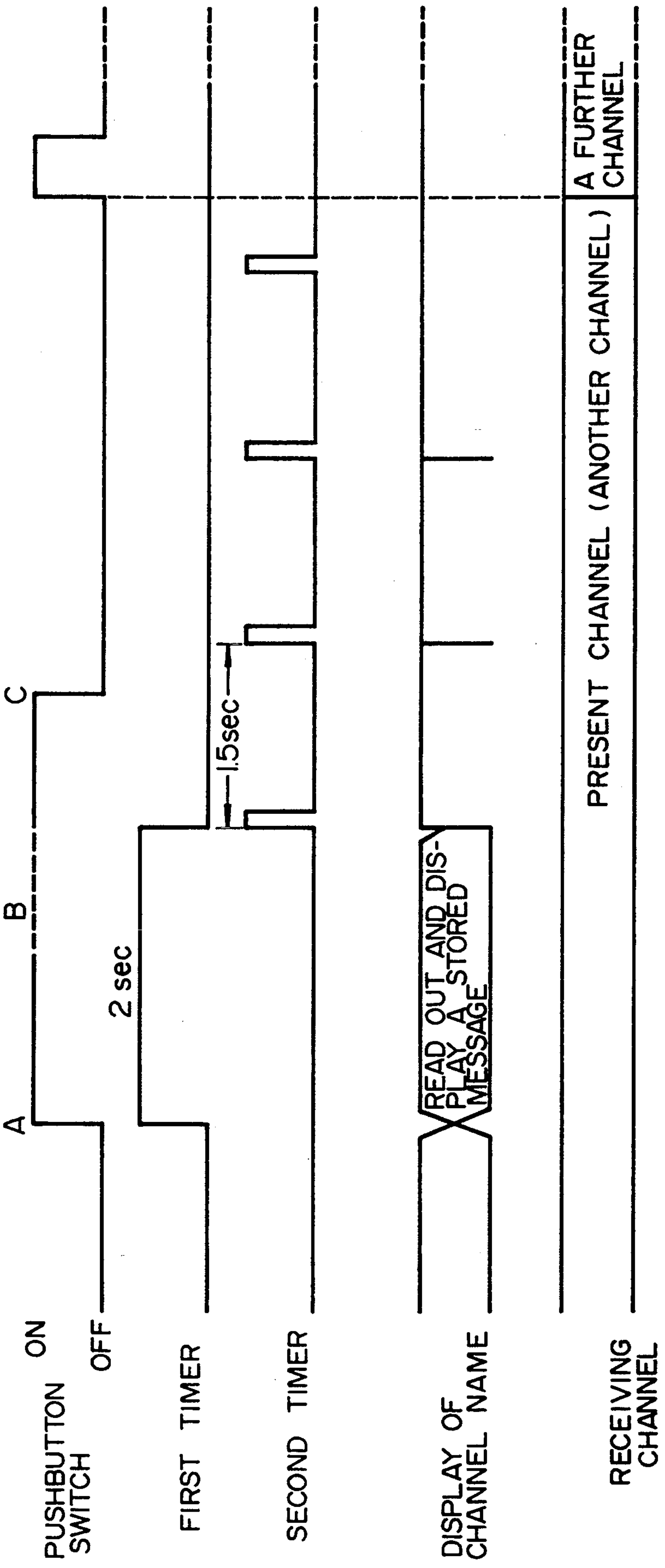
FIG. 3 is a timing chart for explaining the operation of the embodiment of FIG. 1.
Figure 4:
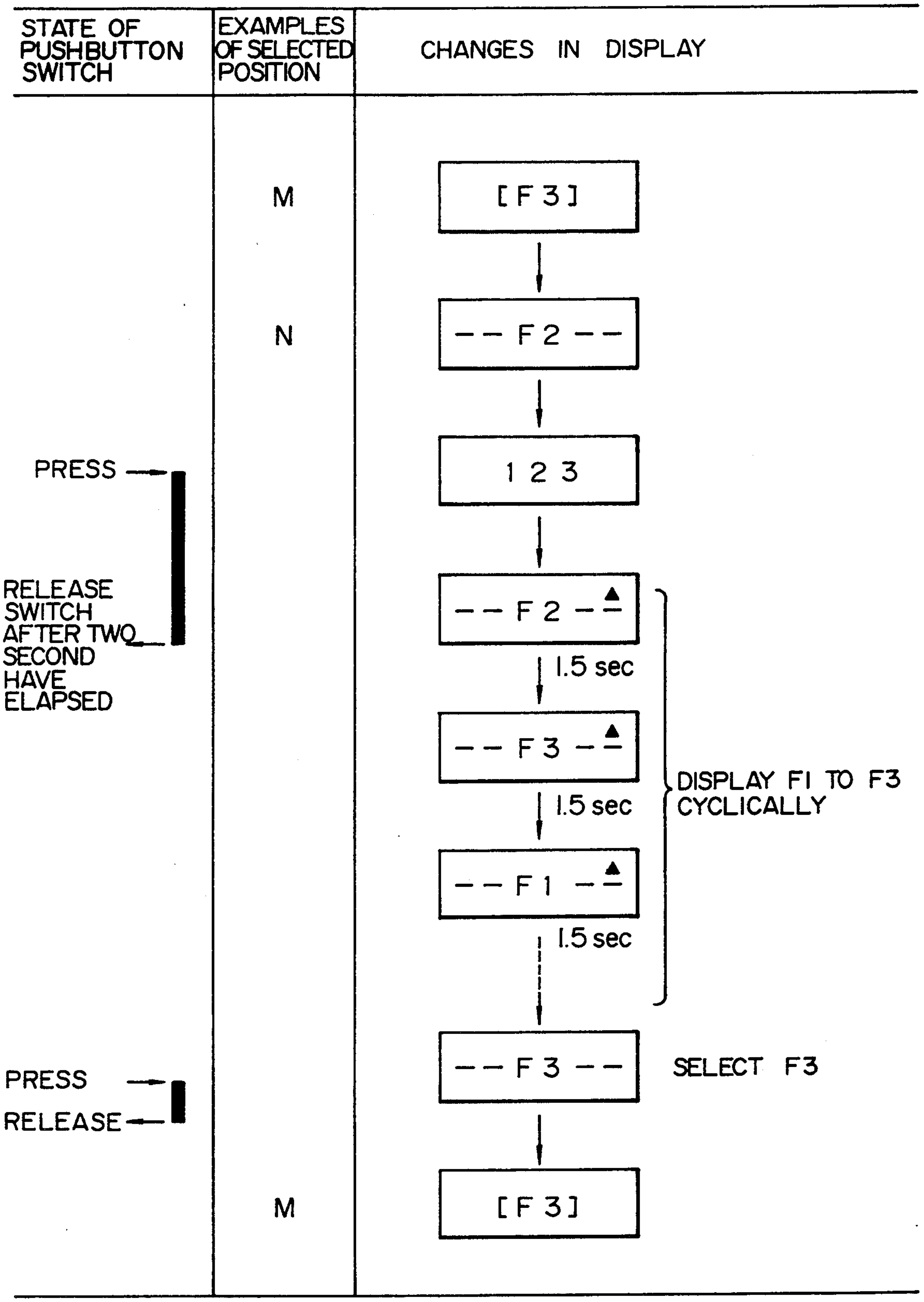
FIG. 4 shows examples of the image displayed by the display device of FIG. 1.
Figure 5:
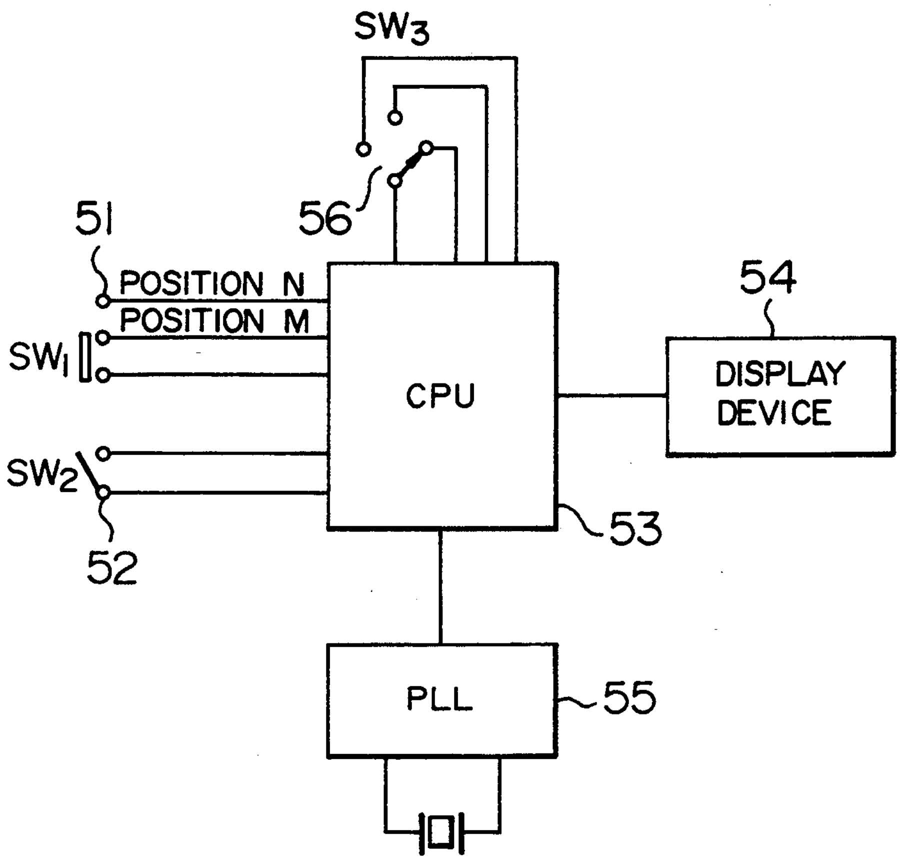
FIG. 5 is a block diagram showing an individual selective-calling receiver according to a prior art.

Next, the operation of the present embodiment will be explained, with reference to a timing chart shown in FIG. 3 and those examples of the image displayed by the display device which are shown in FIG. 4.

In FIG. 4, a display symbol [ ], used for showing a displayed image, indicates that the slide switch 21 is set to a position M, and another display symbol— — indicates that the slide switch 21 is set to a position N. Further, the positions M and N are generally used in the operation switch of a pocket bell (pager) which is available from the Nippon Telegraph and Telephone Public Corporation (NTT) or others, to select the presence or absence of ringing and to select various functions.

When the slide switch 21 is put in a channel changing state and the pushbutton switch 11 is pressed, the output signal on the output line 12*a* is maintained for the period during which the pushbutton switch 11 is pressed, to operate the first timer 16, thereby performing a time counting operation. In the a case where the time when the pushbutton switch 11 is pressed, is shorter than a predetermined time (for example, two seconds), the first timer 16 delivers no output signal. Thus, the displayed channel name is not changed. Accordingly, the currently set channel name is displayed and then a stored message (for example, a numeral 123 shown in FIG. 4) is displayed.

Further, in the case where the time during which the pushbutton switch 11 is pressed is longer than the predetermined time, the first timer 16 delivers an output signal to operate the second timer 15. In this case, even when the pushbutton switch 11 is released, the second timer 15 continues a time counting operation, and channel names are cyclically displayed under control of the CPU 13. At this time, the second timer 15 generates a pulse signal at intervals of time necessary for recognizing a displayed channel name visually (for example, 1.5 seconds), and the CPU 13 controls the display device 14 so that channel names (for example, F1, F2, and F3) are successively displayed at the above time interval.

A user waits for the display of a desired channel name. When the desired channel name is displayed, the pushbutton switch 11 is again pressed in a period when the desired channel name is displayed. Thus, this channel name is displayed, and an operation for selecting a channel indicated by this channel name is started. In the case where the pushbutton switch 11 is not pressed in a predetermined period, it is judged on the basis of the number of pulses delivered from the second timer 15 that a desired channel name is not included in the displayed channel names. Thus, a sign for indicating that the slide switch 21 is kept at the channel changing state, is displayed, and the cyclic display of the channel names is stopped.

When a channel name is selected, the cyclic display of the channel names is stopped, and data on a channel indicated by the selected channel name is sent from the CPU 13 to the PLL 17, to control the frequency dividing ratio for the oscillation frequency of the quartz oscillator 18, thereby selecting a desired receiving channel.

As is evident from the above explanation of the present embodiment, the frequency dividing ratio which is set in the PLL 17, is changed by a control signal from the CPU 13. Accordingly, it is easy to make a receiving frequency agree with a desired channel by software. Thus, in addition to the ON-OFF action for a power source, the changeover of calling mode and the readout of a stored message, the changeover of channel can be readily made by a single switch. That is, an individual selective-calling receiver according to the present invention can be made small in size and weight, and moreover can be additionally possessed of a function of selecting a desired one of channels, without increasing manufacturing cost.

I claim:

1. An individual selective-calling receiver comprising:

a central processing unit (CPU);

a switch for being selectively placed operator;

a switch state judging circuit, connected between said CPU and said switch, for judging a state of said switch and supplying a state signal, indicative of the state of said switch, to said CPU;

said CPU, responsive to receipt of said state signal, outputting an ON-state signal when said state signal indicates that said switch is in said ON-state;

a first timer, connected to receive said ON-state signal, for generating a first output signal in response to said ON-state signal being generated for a time period longer than a first predetermined time period; and a receiving-frequency selection circuit, connected to said CPU, for selecting one of a plurality of receiving frequencies at which said individual selective-calling receiver is to operate, said CPU, in response to said first output signal of the first timer, operating (i) to begin a frequency selection operation for selecting said one of said receiving frequencies, and (ii) after selection of said one of said receiving frequencies, to supply frequency selection information specifying said one of said receiving frequencies to said receiving-frequency selection circuit.

2. An individual selective-calling receiver for use in a communication system, in which a plurality of receivers are and a specified one of the receivers is selectively called by using a selected one of a plurality of transmitting frequencies, said individual selective-calling receiver comprising:

a switch;

a first timer, operatively associated with said switch, for generating an output signal in response to said switch being placed in an ON-state for a time period longer than a first predetermined time period;.

a second timer, operatively associated with said first timer and started in response to the output signal of the first timer, for generating an output signal at predetermined time intervals; and a receiving-frequency selection circuit, operatively associated with said first timer and said second timer, for performing a frequency selecting operation to select one of a plurality of receiving frequencies, said receiving-frequency selection circuit (i) commencing said frequency selecting operation on the basis of the output signal of the first timer, wherein the plurality of receiving frequencies are successively selected by said receiving-frequency selection circuit in accordance with the output signal of the second timer, and (ii) stopping the frequency selecting operation when the switch is placed in the ON-state after having been placed in an OFF-state at some time after said output signal of said first timer is generated, to select said one of said plurality of receiving frequencies.

3. An individual selective-calling receiver according to claim 1, further comprising a second timer, connected to said CPU, activated in response to the first output signal of the first timer, for generating a second output signal at predetermined time intervals, wherein said CPU, during said frequency selection operation, successively changes the receiving frequency in response to the second output signal, and said CPU stops the frequency selecting operation when said switch is placed in the ON-state after being placed in an OFF-state at some time after said output signal of said first timer is generated, to select said one of said plurality of receiving frequencies.

4. An individual selective-calling receiver according to claim 3, further comprising a display device, connected to said CPU, for displaying the selected receiving frequency information.

5. An individual selective-calling receiver according to claim 4, further comprising display means for successively displaying said plurality of receiving frequencies successively selected by said receiving-frequency selection circuit.

* * * * *